United States Patent [19]

Hovland et al.

[11] Patent Number: 4,599,785

[45] Date of Patent: Jul. 15, 1986

[54] METHOD FOR INSTALLING A MOUNTING STRUCTURE ON THE EXTERIOR OF A BUILDING

[75] Inventors: Lyle W. Hovland, Murrysville; James D. Klingensmith, Apollo, both of Pa.

[73] Assignee: Aluminum Company of America, Pittsburgh, Pa.

[21] Appl. No.: 682,425

[22] Filed: Dec. 17, 1984

Related U.S. Application Data

[62] Division of Ser. No. 473,018, Mar. 7, 1983, Pat. No. 4,510,502.

[51] Int. Cl.[4] .......... B23P 19/00

[52] U.S. Cl. .......... 29/526 R; 403/27; 248/536

[58] Field of Search .......... 403/27, 388, 408, 278, 403/880, 282; 29/526 R; 248/536, 237

[56] References Cited

U.S. PATENT DOCUMENTS 2,575,254 11/1951 Blaugrund .......... 248/536 X 3,093,222 6/1963 Christoffersen et al. .......... 403/408

4,138,198 2/1979 Brown .......... 29/526 R 4,427,318 1/1984 Kaminski .......... 403/488 X

*Primary Examiner*—Howard N. Goldberg

*Assistant Examiner*—Irene Golabi

*Attorney, Agent, or Firm*—Brian D. Smith

[57] ABSTRACT

A lightweight mounting structure combination for small dish antennae is provided. The structure includes an upright mast for supporting the dish antennae. The mast has an upper end for attachment to said dish and a lower end for anchoring to a rigid-type structure. The structure also has a bent strut having a lower end for anchoring to a rigid-type structure and an upper end for attachment to said mast. In addition, a second strut is provided having a lower end for anchoring to a rigid-type structure an an upper end for attachment to said mast. Further included is means for anchoring the respective lower ends of the mast, bent strut and second strut to the rigid-type structure and for attaching the respective upper ends of the bent and second struts to the mast. A bolted joint connection and a method for installing a dish antenna mounting structure are also provided.

1 Claim, 11 Drawing Figures

METHOD FOR INSTALLING A MOUNTING STRUCTURE ON THE EXTERIOR OF A BUILDING

This is a divisional of application Ser. No. 473,018, filed Mar. 7, 1983, now U.S. Pat. No. 4,510,502.

FIELD OF THE INVENTION

The invention relates generally to a mounting structure for antennae, and more particularly to a mounting structure for parabolic dish antennae oriented to receive signals transmitted by satellites in geostationary orbit about the earth.

BACKGROUND OF THE INVENTION

Signals (typically television signals as contemplated herein) transmitted by geostationary satellites are generally received on the ground by parabolic dish antennae. The strength of the signal being transmitted determines the size or diameter of the dish required for reception (i.e., weaker signals require larger dishes). At the present time, signals being transmitted generally require a dish having a diameter of three meters or more for proper reception. In the near future, however, it is anticipated that satellites transmitting more powerful signals will be put into orbit, thereby permitting the use of dish antennae having greatly reduced diameters. Such dishes will obviously cost less than today's large dishes. Accordingly, it is expected that many homeowners and owners of apartment buildings will want to purchase the smaller dish for television viewing in the home or apartment. As a consequence, the dish will require installation or mounting on a variety of rooftops of varying slopes and configurations. Accordingly, the dish's mounting structure will have to be capable of supporting the dish on such surfaces and should do so in a manner that rigidly and securely fixes the dish since proper reception therewith requires that the dish accurately maintain its preset alignment with the transmitting satellite.

SUMMARY OF THE INVENTION

The present invention provides a strong lightweight mounting structure for small dish antennae which can be rigidly and securely fixed to a roof or other type of rigid structure. The mounting structure includes an upright, vertically extending mast having its lower end anchored to the roof or rigid-type structure. Also included in the mounting structure is a bent strut having its upper end attached to the mast's midsection and its lower end anchored to the roof at a location preferably horizontal to that of the mast. Additionally included in the mounting structure is a second strut, preferably straight, having its upper end attached to the mast's midsection, preferably at or near the location where the bent strut is attached and its lower end anchored to the roof or rigid-type structure. In a preferred embodiment, the two struts form an approximate right angle as measured in a plane perpendicular to the vertically extending mast. Attachment and anchoring, as referred to above, are preferably provided by means which includes a bracket fastened rigidly to the respective surface (i.e., either the mast or rigid-type structure), a threaded bolt having a shank which extends through said bracket and a deformable portion of the end of the respective member (i.e., either the mast, the bent strut, or the second strut) and a nut threaded on said bolt for drawing the bracket and deformable portion tightly together. In addition, the bolt, nut, bracket and deformable portion cooperate to indicate to one tightening the nut and bolt when a predetermined extent of tightening is attained, said predetermined extent of tightness being characterized by said deformable portion having undergone a predetermined degree of deformation, said deformation and tightness having previously been determined to prevent relative movement between the deformable portion and the bracket. It will also be appreciated that the tightness indicating concept of the present invention is applicable to any bolted joint connection where one of the members to be joined is deformable and where it is important that the joint be properly tightened.

The present invention also provides a method of installing a mounting structure comprised of tubular members on a roof or other type of rigid structure wherein the roof is made of typical roofing materials and supported by typical rafters. The method includes the steps of finding the rafters, attaching brackets to the rafters by directing fastening means through the brackets and roofing materials and into the rafters, placing the ends of the tubular members on the brackets, the brackets and the ends of the tubular members having apertures therein for receiving a bolt, aligning the apertures of each bracket and an associated end of a tubular member, inserting a bolt having a shank through the aligned apertures, threading a nut on the exposed end of the bolt's shank, and tightening the respective nuts and bolts to a predetermined extent to prevent relative movement between the tubular members and the brackets, said extent being indicated and characterized by a predetermined amount of deformation in the tubular member.

DETAILED DESCRIPTION OF THE PREFERRED EMBODIMENTS

Figure 3:
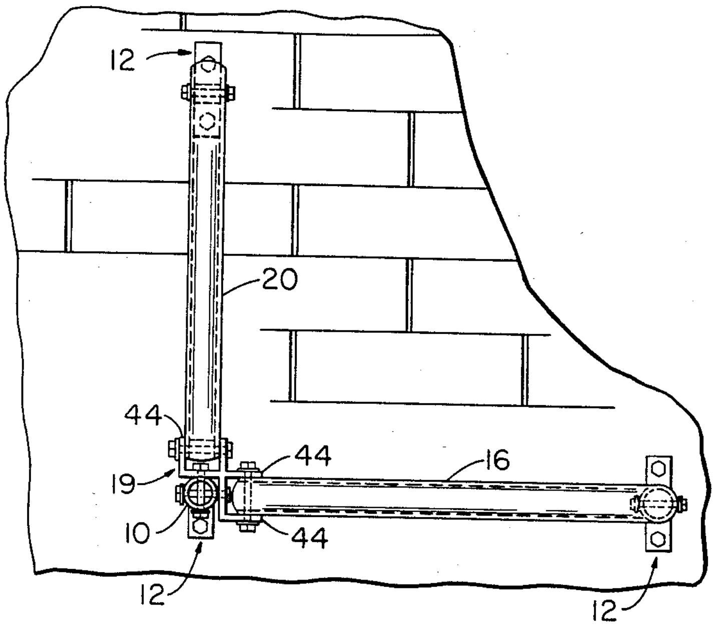
FIG. 3 is an overhead view of the mounting structure of FIGS. 1 and 2; however, to permit this view the dish has been removed.
Figure 2:
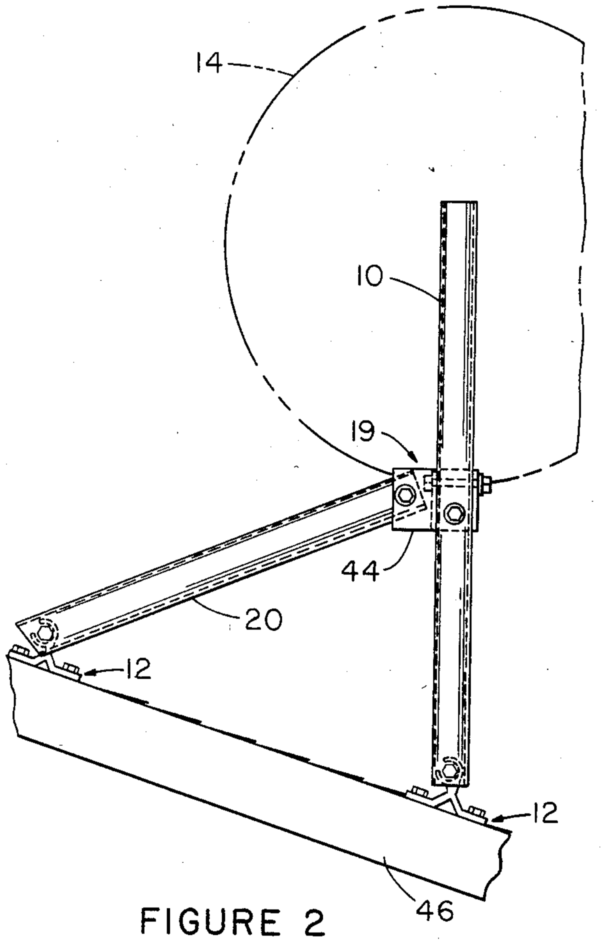
FIG. 2 is a rear elevational view of the mounting structure illustrated in FIG. 1.
Figure 1:
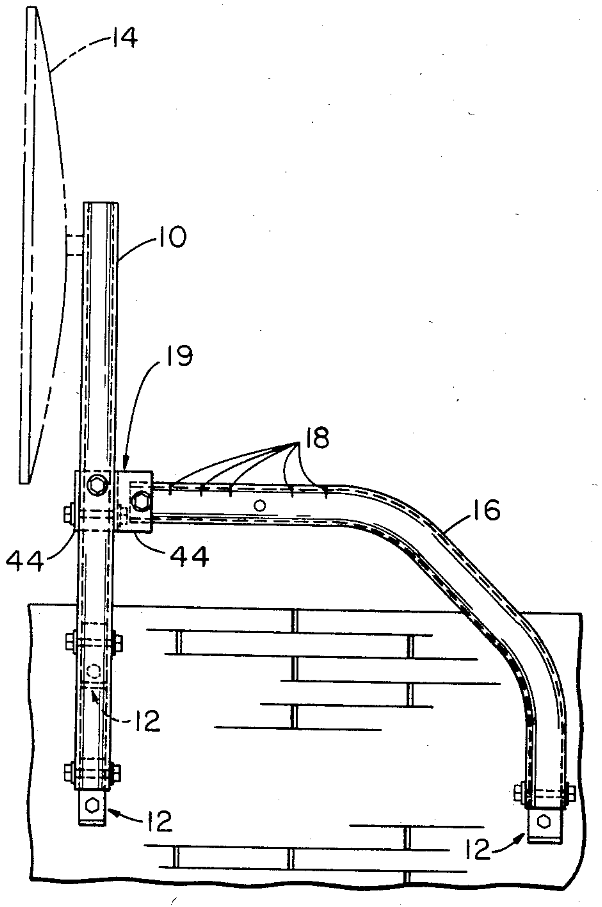
FIG. 1 is a side elevational view of a dish antenna mounting structure embodying the present invention.

Referring now to the drawings, it will be seen that FIGS. 1 through 3 illustrate an embodiment of the mounting structure of the present invention secured to a conventional roof having a slope of approximately 18°. The mounting structure includes a mast 10 which, as illustrated, is tubular and can be made from any piping material having sufficient strength. Aluminum pipe made from alloy 6061-T6 is preferred, however, because of its strength, light weight, low cost and weatherability.

Referring back to the drawings, specifically FIG. 2, it can be seen that the lower end of the mast is secured or anchored to the roof by a pivotal anchor bracket 12 which will be discussed in more detail, infra. The upper end of the mast is attached to an antenna dish 14. While a specific means for attaching the upper end of the mast to the dish is not shown, those skilled in the art will be familiar with numerous means for such attachment.

Referring now to FIG. 1, there is shown a tubular bent strut 16, preferably made from the same piping material as the mast. The upper end of strut 16 is attached to a point on the mast's midsection by a mast bracket 19 (also to be described in more detail, infra), and the lower end thereof is secured to the roof by another pivotal anchor bracket 12 to be discussed, infra. The 90° bend in the strut is important in that it permits the bent strut and mast to pivot together on their respective anchor brackets 12 which, as can be seen in FIG. 1, are in parallel alignment with respect to one another. Simultaneous pivoting simplifies the mounting structure's installation process and will be described in more detail, infra. It can also be seen in FIG. 1 that the bent strut is anchored to the roof at a location which is horizontal with respect to the mast's point of anchoring. This also facilitates ease of installation and will be discussed, infra. Further, it can be seen in FIG. 1 that the bent strut is provided with marks 18 along its upper straight end. These marks indicate the distance between each mark and the outermost edge of the bent strut's upper end and are also provided for purposes of easing installation; their use will also be described in more detail, infra.

Referring again to FIG. 2, it can be seen that mast 10 is also supported by a second strut 20 which is straight and preferably made from the same tubular material as the mast and bent strut. The upper end thereof is attached to the mast at a point along its midsection by bracket 19 which, as mentioned earlier, also preferably attaches the bent strut to the mast. The lower end of the second strut is anchored to the roof by another anchor bracket 12. It can also be seen in FIG. 2 that the lower end of the second strut is slightly beveled. Such beveling facilitates installation on roofs having a steep slope. A 25° bevel, as depicted in FIG. 2, can accommodate slopes up to 45°.

Referring now to FIG. 3, which is an overhead view of the mounting structure, it can be seen that the second strut and the bent strut form an approximate 90° angle in a plane perpendicular to the vertically extending mast. A 90° angle is preferred because it has been found to provide good resistance to wind buffeting and gusting.

Figure 4:
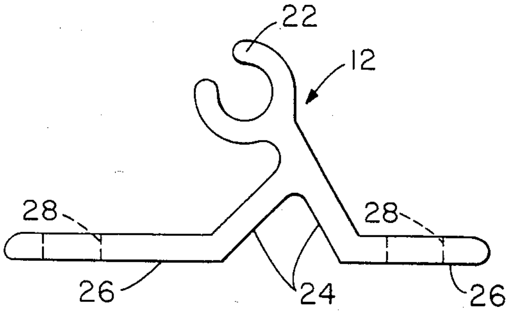
FIG. 4 is a side elevational view of the anchor bracket illustrated in FIGS. 1–3.
Figure 5:
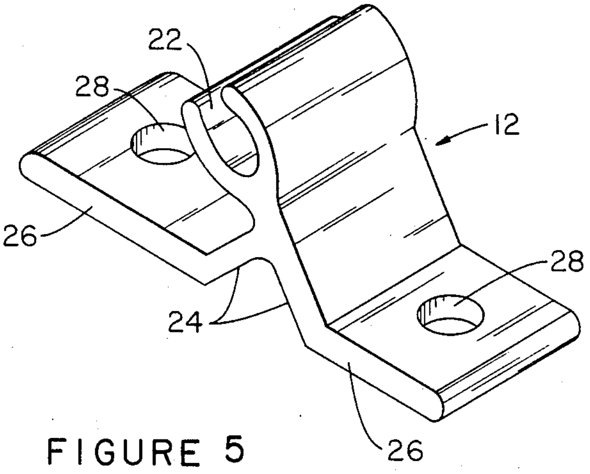
FIG. 5 is a perspective view of the anchor bracket illustrated in FIG. 4.

Pivotal anchor bracket 12 referred to above is best illustrated in isolation in FIGS. 4 and 5. As can be seen, the anchor bracket includes a bolt chamber 22 for receiving a threaded bolt. Supporting the bolt chamber is an inverted V-shaped, double-legged base portion 24 which integrally joins the chamber along the junction created by the intersection of the legs. Each of the legs is further provided with an integral out-turned flange 26 at the respective leg's end opposite the juncture. As illustrated in FIG. 5, each of the flanges is provided with an aperture 28 through which a lag screw may be inserted for securing the bracket to the roof or rigid-type structure. Those skilled in the relevant art will appreciate that the anchor bracket, with the exception of the apertures in the flanges, can be made by a simple extrusion process. An extruded metal bracket made from aluminum alloy 6061-T6 performed well under test conditions.

Figure 7:
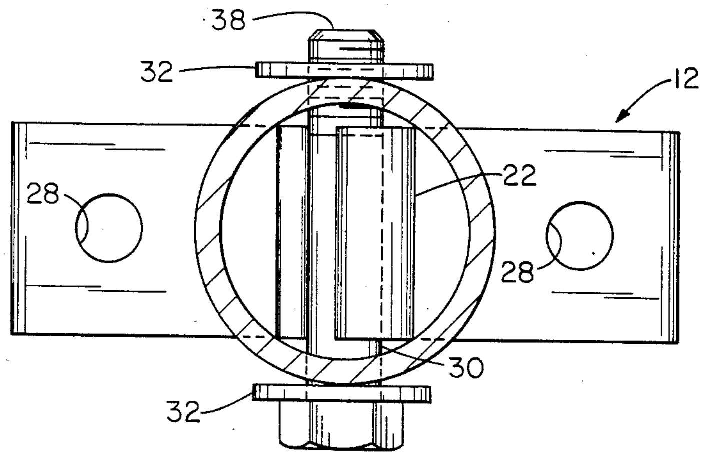
FIG. 7 is a fragmentary cross-sectional view of that illustrated in FIG. 6.

FIGS. 6 through 9 provide various views of anchor bracket 12 attached to an end of one of the tubular members (i.e., either the end of one of the struts or the mast). As can be visualized from FIG. 6, the bolt chamber of the anchor bracket is disposed in the open end of the tubular member. As shown in FIG. 7, a threaded bolt 30 extends through an aperture (not numbered) provided on one side of the tubular member's end, through bolt chamber 22 and through an aperture (not numbered) provided on the other side of the tubular member's end. Washers 32 are also provided.

Figure 8:
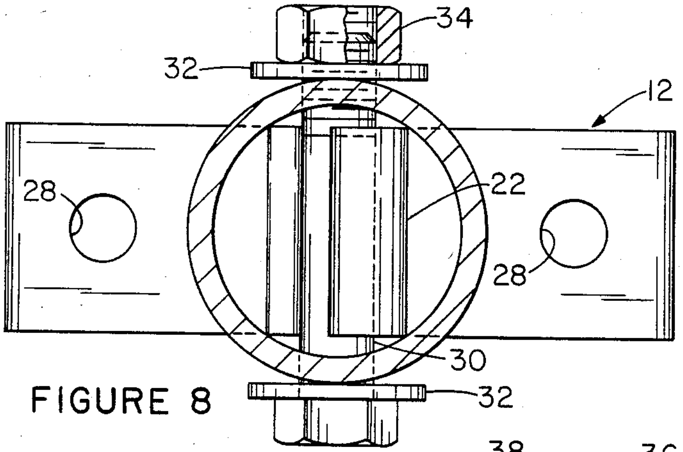
FIG. 8 is the view of FIG. 7 illustrating, however, a nut partially threaded on the exposed end of the bolt shank depicted in FIG. 7.

In FIG. 8, a nut 34 is shown partially threaded (i.e., untightened) on the exposed end (as depicted in FIG. 7) of the bolt shank. As such, one installing the mounting structure will be able to pivot the tubular member about the bolt provided in the anchor bracket, which for reasons to be explained, infra, simplifies the installation process.

Figure 6:
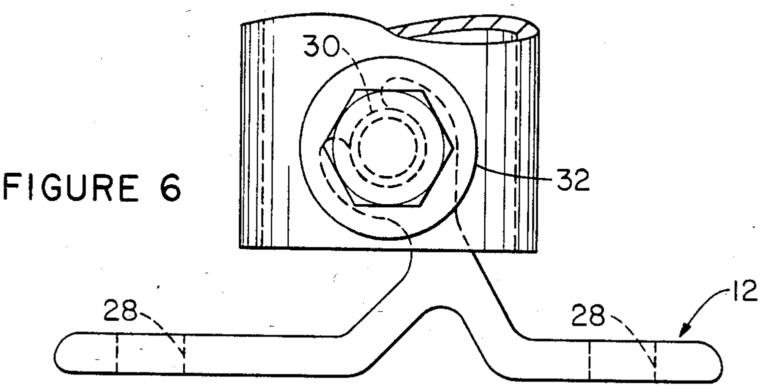
FIG. 6 is a fragmentary side elevational view of the anchor bracket attached to an end of a tubular member.
Figure 10:
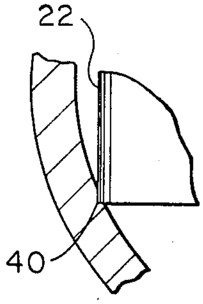
FIG. 10 is an amplified fragmentary view of FIG. 9 illustrating the edge of the bolt chamber indenting the inner surface of the tubular member.
Figure 9:
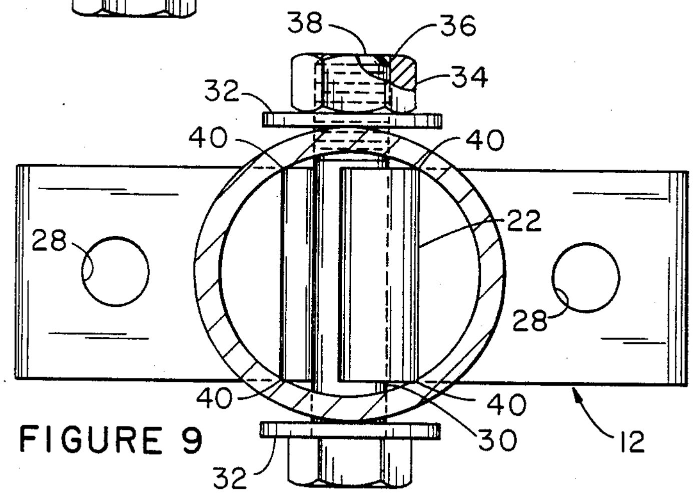
FIG. 9 illustrates the nut of FIG. 8 threaded to a point where the exposed end surface of the nut is flush with the end surface of the bolt shank.

FIG. 9 is a depiction of the joint connection illustrated in FIGS. 6 through 8 as it would appear after installation, i.e. after the nut and bolt have been tightened a predetermined extent that prevents pivoting. A close look at the drawing will reveal that the nut has been threaded to a point where its exposed end surface 36 is flush with that of the bolt shank, i.e. bolt shank end surface 38. Another close look at FIG. 9 will reveal that the tubular member's previously substantially circular cross section (see FIG. 8) is now much more oval in shape, such deformation having been caused by tightening the nut and bolt. It can also be seen in FIG. 9 that the inside surface of the tubular member contacts the bolt chamber's outer surface in four places which are identified in FIG. 9 by numeral 40. This contact is best illustrated in FIG. 10 which provides an amplified view thereof. As can be seen therein, the edge of the bolt chamber actually indents the inner surface of the tubular member. This indentation, in conjunction with the pressure applied by tightening the nut and bolt, is believed to further restrain the tubular member from pivoting on the anchor bracket. Such movement or movement by the mounting structure of any sort should not take place since, as previously mentioned, it is extremely important that the dish antenna's alignment with the transmitting satellite be accurately maintained. To minimize the possibility of such movement, all nut and bolt combinations of the mounting structure should be properly tightened, particularly those most likely to loosen. Therefore, it would be advantageous if one installing the mounting structure knew when the nuts and bolts were properly tightened. It would also be convenient if an installer working on a roof could determine the point of proper tightening without having to use a torque wrench or some other similar device. Accordingly, this embodiment of the present invention employs an anchoring and attaching means that indicates to an installer that proper tightening is attained when, as depicted in FIG. 9, the exposed end surface of the nut is flush with the end surface of the bolt shank. This is accomplished by employing a bolt having a predetermined length, a nut having a predetermined depth, and a tubular structure having a predetermined diameter, thickness and elasticity, all of which cooperate together to indicate to one tightening the nut and bolt that the proper predetermined extent of tightness is attained when the exposed end surface of the nut is flush with the end surface of the bolt shank.

Thus, it will be recognized that a manufacturer of the mounting structure can determine how much pressure should be applied to a particular joint connection to prevent its movement and, with such knowledge, design the components of the joint connection accordingly to provide such a tightness indicating means, thereby making it easy for one installing the structure to recognize when the particular nut and bolt are properly tightened. As a result, overtightening is avoided which might otherwise strip the threads on the bolt or nut or even fracture the end of the tubular member. Other means based upon deformation of the tubular member and the nut-bolt-flush surface concept will be apparent to those skilled in the art and are intended to be within the scope of the present invention. For example, instead of providing the bolt with a predetermined length, the bolt could be provided with a predetermined amount of thread which, in cooperation with a tubular structure having a predetermined diameter, thickness and elasticity, would indicate to one installing the mounting structure that the predetermined extent of tightness is attained when the nut and bolt cannot be tightened any further. Such would also indicate that the nut has reached the end of the bolt threads. Similarly, another variation on the same theme would be to provide a nut with a predetermined depth and a bolt with a mark on its shank which, upon cooperating with a tubular structure provided with a predetermined diameter, thickness and elasticity, would indicate to an installer that the predetermined extent of tightness is attained when the exposed end surface of the nut is flush with the mark provided on the bolt shank.

Those skilled in the relevant art will appreciate that the above tightness indicating concept is not limited to a dish antenna mounting structure and can be applied to any bolted joint connection where proper tightening is important. The only requirements are the following. One of the members to be joined should have a deformable portion with a bore extending therethrough. The deformable portion should preferably have some degree of elasticity. The second member to be joined should also have an aperture or at least a slot extending through a portion thereof. But, the second member would not necessarily have to be deformable. Additionally required is a bolt having a shank portion extending through the respective bore and aperture. The final element is a nut threaded on said bolt for drawing the first and second members tightly together. As such, one tightening the nut and bolt will know when they are properly tightened if he knows what extent of deformation must take place to provide the required degree of tightness, which, of course, can be determined beforehand for him by a manufacturer of the unassembled joint connection.

Figure 11:
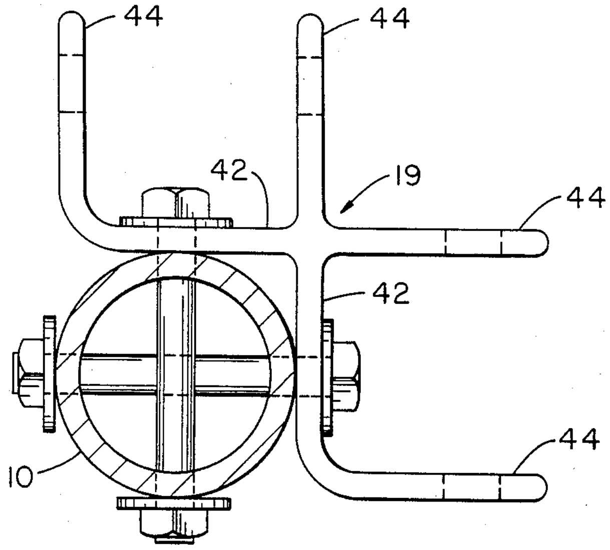
FIG. 11 is a fragmentary cross-sectional view taken from FIG. 3 illustrating the mast bracket securely bolted to the mast.

Referring now to FIG. 11, there is illustrated an overhead view of mast bracket 19 employed in the present embodiment for attaching the upper ends of the bent and second struts to the mast. As can be seen therein, the mast bracket, preferably made from extruded metal, preferably aluminum alloy 6061-T6, has two wall portions 42 extending perpendicular to each other. Each wall portion has extending therefrom two integral parallel extensions 44 for receiving the ends of the struts. As depicted in FIG. 11, wall portions 42 are securely bolted to the mast. Other suitable means for rigidly securing the mast bracket to the mast include welding, riveting and other means apparent to those skilled in the relevant art. Attachment of the respective struts to the respective parallel extensions of the mast bracket is perhaps best illustrated in FIGS. 1 through 3. As can be seen therein, the upper end of bent strut 16 is disposed between one pair of the parallel extensions of the mast bracket. As seen in FIGS. 2 and 3, the upper end of second strut 20 is disposed between the other pair of parallel extensions of the mast bracket. Each strut is secured to its respective parallel extensions by a nut and bolt (not numbered) wherein the bolt extends through apertures (not numbered) provided in the respective parallel extensions and strut ends. The struts, before tightening the respective nut and bolt, may then pivot about the bolt in a fashion similar to that previously described for the anchor bracket. As with the anchoring means, these nuts, bolts, respective parallel extensions and tubular struts are, preferably, properly dimensioned to indicate to one installing the mounting structure that the nut and bolt are properly tightened when the exposed surface of the nut is flush with the end surface of the bolt shank.

Another advantage of the mounting structure of the present invention is the ease with which it can be installed. As illustrated in FIG. 2, most conventional roofs have rafters 46 into which fastening means securing the anchor bracket may be directed. Thus, the first step for one installing the present mounting structure is to find or locate the rafters. This can be accomplished, for example, by using a device called a Studsensor made by the Richie Company of Redwood City, Calif. 94063 which enables one to find the rafters without having to remove any shingling or roofing material. After finding the rafters, the mast and the bent strut anchor brackets 12 are fastened to the roof by directing a fastening means, such as a lag screw, through the brackets and roofing material and into the rafters, thereby securely and rigidly fastening the anchor bracket to the roof. As mentioned previously, the anchor brackets for the mast and the bent strut are preferably in parallel alignment with respect to one another and located in the same horizontal plane. This, as will be seen, facilitates erection of a plumb or vertically extending mast. At this point, the lower ends of the mast and bent strut should be located or placed on the bolt chamber of each respective anchor bracket. The apertures provided in the mast's and bent strut's ends are then aligned with the apertures of the respective bolt chamber. A bolt having a shank is inserted through the aligned apertures and a nut is threaded on the exposed end of the bolt shank. The upper end of the bent strut may then be inserted or placed between its respective parallel extensions of the mast bracket, the mast bracket preferably having already been secured to the mast. The apertures in the parallel extensions of the mast bracket and the upper end of the bent strut are then aligned and a bolt is inserted through the apertures and a nut is threaded on the exposed end of the bolt shank. It will be seen, however, that before the nut and bolt on the respective anchor brackets are tightened, the now joined bent strut and mast can pivot together in the same direction on the bolts provided in the parallelly aligned anchor brackets. If the anchor brackets are also, as previously mentioned, anchored in the same horizontal plane, one will be able to find a truly vertical or plumb position for the mast by pivoting the mast with a carpenter's level to the point where the carpenter's level indicates that a true vertical or plumb position is attained. This point should then be marked. With knowledge of this point, the precise location for the second strut's anchor bracket can be located, at which point it should be secured to the roof. The second strut may then be installed in a fashion similar to that described for the bent strut. The mounting structure will now be freestanding; however, the mast should preferably be checked again with a level to be certain that it is plumb. When satisfied that the mast is plumb, the nuts and bolts on the respective anchor brackets and the mast brackets should be tightened to the proper extent which, in the embodiment described, is attained when the exposed end surface of the nut is flush with the end surface of the bolt shank.

Since the rafters or studs on roofs of more recently built homes are typically 24 inches apart, the bent strut, as contemplated in the embodiment shown, would normally extend 24 inches in the horizontal direction. If, however, the studs are closer together, for example 16 inches apart, an installer will have to cut or saw an appropriate amount from the upper end of the bent strut. To facilitate an installer who will have to remove a portion of the bent strut, marks 18 are preferably provided at least every two inches along the upper end of the bent strut, thereby indicating to an installer the distance between the mark and the outermost edge of the mast end.

By way of final note, it should be noted that all components of the mounting structure of the present invention can be made from aluminum alloys which thereby minimizes the possibility of galvanic corrosion occurring and contributes to the structure's light weight.

While the invention has been described in terms of preferred embodiments, the claims appended hereto are intended to encompass all embodiments which fall within the spirit of the invention.

What is claimed is:

1. A method for installing a mounting structure on the roof of a building having rafters and roofing materials located over the rafters, the method comprising the steps of:

finding the rafters;

fastening brackets to the rafters by directing fastening means through the brackets and roofing materials and into the rafters;

placing the ends of tubular members in or on the brackets, the bracket and the ends of the tubular members having apertures therein for receiving a bolt;

aligning the apertures of each bracket and an associated end of a tubular member;

inserting a bolt having a shank through the aligned apertures;

threading a nut on the exposed end of the bolt's shank; and tightening the respective nuts and bolts to a predeterminted extent to prevent relative movement between the tubular members and the brackets, said extent being indicated and characterized by a predetermined amount of deformation in the tubular member.

* * * * *